Feb. 11, 1930.  F. W. MEYER  1,746,670
REGULATOR
Filed April 29, 1920   2 Sheets-Sheet 1

Inventor
Friedrich W. Meyer
Atty.

Feb. 11, 1930.   F. W. MEYER   1,746,670
REGULATOR
Filed April 29, 1920   2 Sheets-Sheet 2
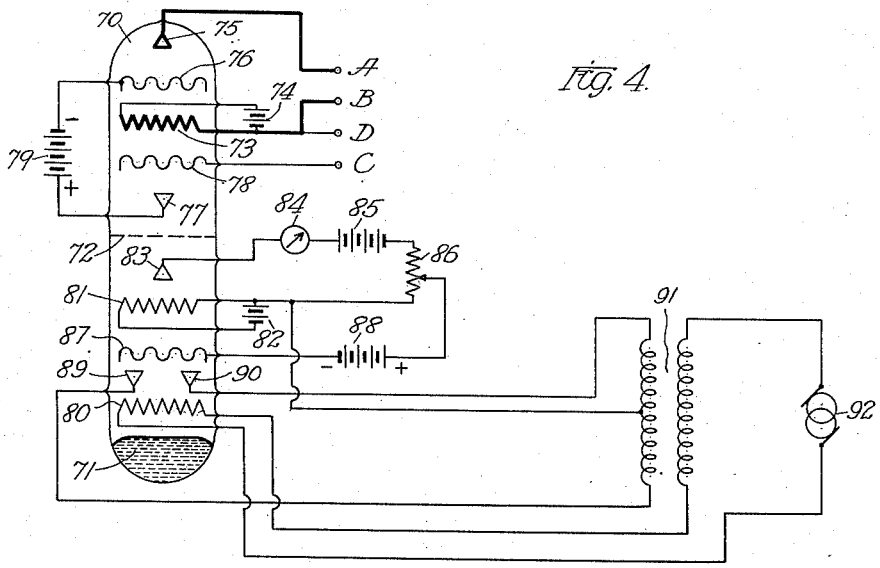
Fig. 4.
Fig. 5.
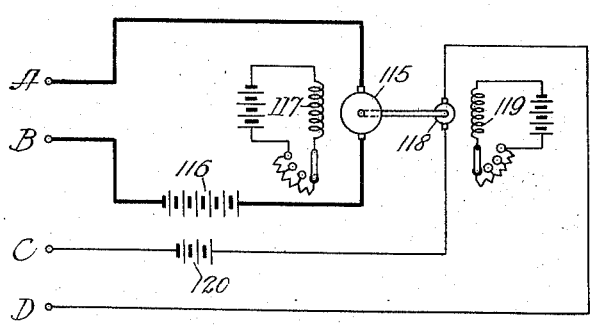
Inventor
Friedrich W. Meyer
Edwin B. H. Toerer Jr.
Atty.

Patented Feb. 11, 1930

1,746,670

UNITED STATES PATENT OFFICE

FRIEDRICH WILHELM MEYER, OF MILWAUKEE, WISCONSIN, ASSIGNOR, BY MESNE ASSIGNMENTS, TO CUTLER-HAMMER, INC., OF MILWAUKEE, WISCONSIN, A CORPORATION OF DELAWARE

REGULATOR

Application filed April 29, 1920. Serial No. 377,569.

This invention relates to regulators.

It is particularly applicable to regulating the gas pressure in an electroionic valve, although not limited to such use.

One of the objects of this invention is to maintain a constant gas pressure in an electroionic relay.

Another object is to provide improved means for measuring the gas pressure of an electroionic valve or relay.

Another object is to provide an improved pressure regulator.

Another object is to provide improved means for regulating the pressure in electroionic valves or relays.

Other objects and advantages will appear from the following description and claims.

Embodiments of the invention are illustrated in the accompanying drawings, wherein, Figure 1 shows an electroionic valve or relay in which constant gas pressure is maintained.

Fig. 4 shows another modified form of constant pressure electroionic relay; and

Fig. 5 shows an adaptation illustrating one of the uses to which the electroionic relays may be put.

Figure 1:
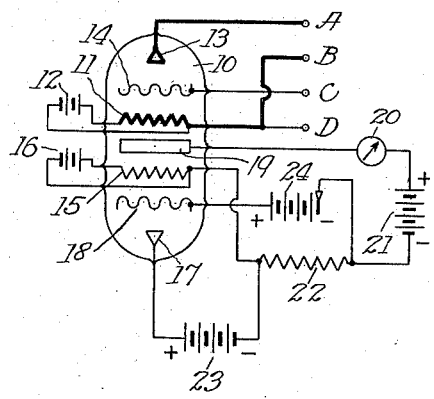

Fig. 1 will first be described.

The electroionic valve or relay 10 comprises a vessel evacuated to the desired degree or filled with a suitable gas of low pressure, such for example, as argon. The vessel is provided with a cathode 11 heated by current from a suitable battery 12. Of course, other means may be employed for heating the cathode, if desired. The vessel also contains an anode 13, and an auxiliary electrode or anode 14 positioned between the cathode and the anode to control the discharge therebetween. This auxiliary anode 14 may take the form of a grid.

The anode 13 and one end of the cathode 11 are connected to terminals A and B respectively which, as will more fully hereinafter appear, may be connected with like designated terminals associated with a machine to be regulated. The grid 14 and one terminal of the cathode 11 are connected with the terminals C and D respectively which may be connected with similarly designated terminals of the controlling, or, as it may be called, the sensitive circuit associated with the machine to be regulated.

As thus far described the electroionic valve or relay 10 functions in the same manner as that shown in Fig. 1 of and described in my Patent No. 1,353,815, granted September 1, 1920.

In order to produce uniform regulating and controlling effects by means of such electroionic valves or relays, the gas pressure thereof should be maintained substantially constant. While such electroionic valves or relays are in operation, there is a gradual lowering of the gas pressure therein due to the absorption of the gas by the walls of the vessel and also by the electrodes therein. Therefore if uniform regulating and controlling effects are to be obtained, it becomes necessary to regulate the gas pressure so as to maintain the same substantially constant.

If the gas pressure in the vessel decreases below a certain normal, the discharge between the relay cathode 11 and anode 13 increases and the resistance therebetween decreases. In other words, the discharge varies with the gas pressure.

The gas pressure regulator comprises a cathode 15 which may be heated by current from a battery 16. The cathode 15 may be an oxide covered Wehnelt cathode or a large metallic cathode which does not disintegrate easily when subjected to the unavoidable bombardment of some positive ions. This cathode 15 emits electrons which bombard an anode 17. This anode 17 may contain a chemical compound, which, as is well known, frees gas when heated by the bombardment of electrons emitted by the cathode 15. An auxiliary electrode or anode 18, which may take the form of a grid, is positioned between the cathode 15 and gas freeing anode 17 and controls the passage of electrons therebetween. The anode 17 in addition to being able to free gas, may also be of such a character as to absorb gas, when there is a proper change in temperature of the anode. The vessel also contains another auxiliary anode 19 connected to the cathode 15 through an indicator 20, a battery 21 and a resistance 22. The indicator 20, which may take the form of a galvanometer, measures the current in the circuit. This current is dependent upon the discharge between the cathode 15 and the anode 19 and is a function of the pressure within the vessel. This indicator may therefore be calibrated to indicate pressures directly if desired.

The connections of battery 21 may be reversed whereby the electrode 15 becomes an anode instead of a cathode. Then a current passes through the indicator 20 only when the vessel contains gas. Of course, in such a case, the connections of the sensitive circuit of the regulator must be reversed.

The anode 17 is connected to the positive pole of a battery 23, the negative pole of which is connected to the cathode 15. The grid 18 is connected to the positive pole of a battery 24, the negative pole of which is connected through the resistance 22 to the cathode 15.

The discharge from the cathode 15 to the auxiliary anode 19 influences the voltage drop in the resistance 22. The voltage drop in the resistance 22 in turn controls the potential of the grid 18. The discharge from the cathode 15 to the auxiliary anode 19 therefore serves to regulate the discharge from the cathode 15 to the gas freeing anode 17. Thus the regulation is effected by the gas pressure itself acting through the regulating discharge and the drop in the resistance. The influence of this regulating discharge, which is great, depends upon the relay ratio between the regulating discharge and the discharge to be regulated. This relay ratio varies with the size of the vessel, and the form and arrangement of the electrodes therein.

It is supposed that the valve or relay is one which when in use constantly needs more gas.

If the pressure within the relay decreases slightly below a desired normal due to the absorption of gas by the walls of the vessel and by the other electrodes therein when the relay is in use, the discharge from the cathode 15 to the auxiliary anode 19 decreases and consequently the voltage drop in the resistance 22 decreases. This causes an increased positive potential on the grid 18 which favors the discharge from the cathode 15 to the gas freeing anode 17. When the pressure within the vessel decreases, the discharge from the cathode 15 to the gas freeing anode 17 decreases at the same time as the discharge to the auxiliary anode 19. The relay ratio of the regulator is such however that the increase in discharge to the gas freeing anode 17 due to the increased positive potential on the grid 18 greatly exceeds the decrease in discharge from the cathode 15 to the anode 17 resulting from the decreasing pressure, so that under all circumstances the gas freeing action is great.

Thus the increased negative potential on the grid 18 allows a greatly increased flow of electrons from the cathode 15 to the gas-freeing anode 17 which is bombarded thereby, and is caused to free or generate gas. This generation or freeing of gas continues until the gas pressure is restored to normal.

If the pressure within the relay increases slightly above the desired normal an increase in the discharge from the cathode 15 to the auxiliary anode 19 results, which causes an increase in the voltage drop in the resistance 22. This increased drop causes a decrease in the positive potential on the grid 18. The resulting discharge to the gas freeing anode 17 is reduced. The temperature of this anode 17 is therefore reduced causing the same to free less gas thereby applying the proper corrective effect to the relay.

It will be understood of course that instead of the simple relay arrangement employed in the regulator of the electroionic valve, a self intensifying relay arrangement such as described in my copending application Serial No. 355,341, filed January 31, 1920, may be employed.

The pressure in the relay may be regulated at will by varying the voltage of the battery 24.

Figure 2:
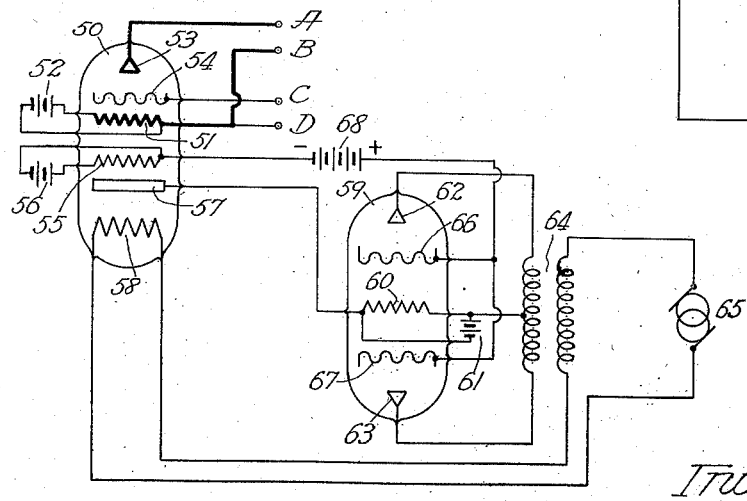
Fig. 2 shows a modified form of constant pressure electroionic relay.

Fig. 2 shows an electroionic valve or relay in which the pressure is regulated by varying the temperature of a heating element.

The electroionic valve or relay 50 comprises a vessel evacuated to the desired degree and filled with a suitable gas of low pressure, such for example, as argon. This vessel may contain the usual relay electrodes, a cathode 51 heated by current from a battery 52, an anode 53, and an auxiliary anode 54 positioned between the cathode and main anode and controlling the passage of electrons therebetween. The auxiliary anode 54 may take the form of a grid.

The anode 53 and one end of the cathode 51 are connected to the terminals A and B respectively; while the grid 54 and one end of the cathode 51 are connected to the terminals C and D respectively. These terminals may be connected with like designated terminals of the control and sensitive circuits associated with the machine to be regulated and controlled.

The vessel also contains a cathode 55 heated by current from a battery 56 and a cooperating anode 57 between which the regulating discharge takes place. In addition the vessel contains a heating element 58 the temperature of which is varied under the influence of the regulating discharge to regulate the pressure within the vessel.

The temperature of the heating element 58 may be varied by varying the voltage drop across a resistance in the cathode circuit by means of the direct utilization of the regulating discharge in a manner similar to Figs. 1 and 2. The regulation of the temperature of the heating element 58 may also be effected through a second electroionic relay such, for example, as relay 59 under the influence of the regulating discharge within the relay 50.

This relay 59 which is of the type disclosed in my copending application, Serial No. 248,855 filed August 8, 1918, comprises the usual evacuated vessel having a cathode 60 heated by current from a battery 61. Anodes 62 and 63 positioned at opposite ends of the vessel are connected to the ends of the secondary winding of a transformer the middle point of which is connected to one end of the cathode 60. The primary winding of the transformer is connected in circuit with a source 65 of alternating current by which the heating element 58 is heated. Auxiliary anodes 66 and 67, which may take the form of grids, are positioned between the cathode 60 and the respective anodes 62 and 63 and control the discharges from the cathode to the anodes. The grids 66 and 67 are connected in parallel and to the positive pole of battery 68 the negative pole of which is connected to one end of the cathode 55 of the relay 50. One end of the cathode 60 of relay 59 is connected to the anode 57 of the relay 50.

The circuit including the regulating discharge between the cathode 55 and the anode 57, which depends upon the gas pressure in the relay 50, constitutes the controlling or sensitive circuit of relay 59. A change in the regulating discharge varies the potential of the grids 66 and 67. A relatively small change in the potential of the grids produces a relatively great change in the discharge between the cathode 60 and the main anodes 62 and 63.

My experiments have shown that the main discharge between the cathode 51 and the anode 53 of the relay 50 may decrease much with an increase of heating current through the auxiliary cathode 58 and that the current of the main discharge increases with a decrease in the heating current. Such results are usually obtained by varying directly the gas pressure within the vessel, and it is well known that the main discharge current increases when the gas pressure increases and decreases with a decrease of gas pressure, on account of ionization influences.

Figure 3:
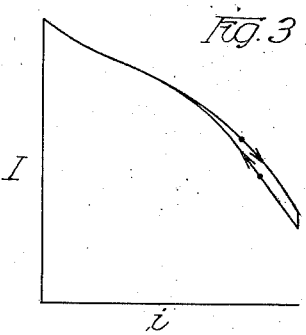
Fig. 3 shows curves of the discharge current under variations of the heating current.

The curve of Fig. 3 represents the action of the main discharge current when the heating current is varied. I represents the current of the main discharge, and $i$ the heating current through the heating element 58. Therefore with proper cathode material, such, for example, as tungsten, an increase of the heating current may be employed to cause a decrease in gas pressure, while a decrease in heating current may be employed to cause an increase of gas pressure. These results may possibly be accounted for by the fact that the heated cathode without the aid of other means absorbs gas at certain temperatures increases and frees gas at other temperatures; or chemical compounds may be formed which may be decomposed again.

If the gas pressure increases slightly above its normal value, the discharge between the regulating cathode 55 and anode 57 increases and the positive potential of the grids 66 and 67 is thereby increased. This increased positive grid potential favors increased discharge from the cathode 60 to the anodes 62 and 63. The resulting increased flow of current in the sections of the transformer secondary during the respective half waves of alternating current induces in the transformer primary an increased regulating current. This increased induced regulating current has the effect of diminishing the effective resistance of the transformer to the current from the source 65, whereby a greater amount of current flows through the heating element 58. The temperature of this auxiliary electrode therefore increases resulting in a decrease in the gas pressure within the relay 50. The proper corrective effect is therefore applied.

If the gas pressure decreases slightly below its normal value, the positive potential of the grids 66 and 67 decreases. The resulting decreased induced regulating current increases the effective resistance of the transformer thereby allowing less current flow through the heating element 58, whereby the proper corrective effect is applied to the relay 50.

If the gas pressure goes below a certain point, the grid potential becomes so low that there is no discharge between the cathode 60 and the anodes 62 and 63. Consequently substantially no current may pass through the heating element 58, whereby the temperature thereof decreases. The heating element 58, when its temperature reaches a certain point, emits gas, whereby the proper corrective effect is supplied to the valve or relay.

It will be understood of course that the valve or relay may contain both a gas freeing anode and a gas absorbing cathode for regulating purposes. Thus a real zero point may be obtained where the regulator is not operative, but which immediately becomes effective if the gas pressure varies from the normal.

It is possible according to my experiments to maintain the current of the main discharge through the influence of an auxiliary discharge path upon the heating element even though the vessel may not be hermetically sealed and therefore may draw air continuously.

Figure 4 shows an electroionic valve or relay in which the gas pressure is maintained constant through the action of a heater for the mercury in the relay.

The electroionic valve or relay 70 comprises mercury 71 for furnishing mercury vapor by which the vessel is filled with gas.

The vessel contains relay electrodes positioned above the separation grid 72 which merely prevents interference between the discharge of the relay and the discharges of the regulator positioned below the grid 72. This grid 72 does not however interfere with the proper distribution of gas within the vessel.

The relay, which is of the self intensifying type disclosed in my copending application Serial No. 355,341 filed January 31, 1920, comprises a cathode 73 heated by current from a battery 74, a main anode 75 and an auxiliary anode 76 positioned between the cathode 73 and anode 75 and controlling the discharge therebetween. This auxiliary anode 76 may take the form of a grid. The relay also includes another auxiliary anode 77, the discharge to which from the cathode 73 is controlled by an auxiliary grid 78 positioned therebetween. The discharge to the auxiliary anode 77 influences the negative potential of the main grid 76 to which it is connected through a battery 79. The negative pole of the battery 79 is connected to the main grid 76.

The main anode 75 and one end of the cathode 73 are connected with the respective terminals A and B, while auxiliary grid 78 and one end of the cathode 73 are connected with the respective terminals C and D. These terminals may be connected with like designated terminals of the control and sensitive circuits associated with the machine to be regulated.

The regulator, which is located below the separation grid 72, controls the temperature of the heating element 80, the heat from which vaporizes the mercury to provide the regulating gas within the vessel. This regulator comprises a cathode 81 heated by current from a battery 82, and an anode 83 between which the regulating discharge passes. The anode 83 is connected through an indicator 84 (which may take the form of a galvanometer), a battery 85 and a resistance 86 to one end of the cathode 81.

The voltage drop in the resistance 86 is utilized to control the negative potential of an auxiliary anode 87 (which may take the form of a grid) to which it is connected through a battery 88. The negative pole of battery 88 is connected to the grid 87. The potential of this grid 87 influences and regulates the discharge of electrons from the cathode 81 to the anodes 89 and 90 positioned below the grid.

The anodes 89 and 90 are connected to the ends of the secondary of a transformer 91, the middle point of which is connected with one end of the cathode 81. The transformer primary is connected in circuit with a source 92 of alternating current by which the heating element 80 is heated.

The regulating discharge between the cathode 81 and the anode 83 determines the voltage drop in the resistance 86. This voltage drop controls the negative potential of the grid 87. Even a small change in this grid potential causes a corresponding great change in the discharge from the cathode 81 to the anodes 89 and 90. This discharge between the cathode 81 and the anodes 89 and 90 is utilized to regulate, through the transformer 91 the current flowing through the heating element 80.

If the gas pressure increases slightly above its normal value, the regulating discharge between the cathode 81 and the anode 83 increases. The voltage drop in the resistance 86 is thereby increased. This increased voltage drop causes the negative potential of the grid 87 to increase. The increased negative grid potential acts to diminish the discharge from the cathode 81 to the anodes 89 and 90 during the respective half waves of alternating current induced through the transformer 91. This diminished discharge causes less regulating current to be induced through the sections of the transformer secondary into the primary whereby less current passes through the heating element 80. Consequently less heat is developed by the heating element 80 and less mercury is vaporized. Thus less vapor is produced and the proper compensating effect is applied. No means need be provided for absorbing gas, for part of the mercury vapor produced is continuously condensing while the valve or the regulator thereof is in operation.

If the gas pressure decreased below its normal value, then the resulting decreased regulating discharge between the cathode 81 and anode 83 produces the opposite effect. That is more current is caused to flow through the auxiliary cathode 80 which develops more heat. More mercury vapor is consequently produced. Thus the proper compensating effect is applied.

Figure 5 shows a direct current motor system with which any of the foregoing constant pressure electroionic valves or relays may be associated to form a complete controlling and regulating system. This figure shows a direct current motor whose armature current is controlled by a constant pressure electroionic valve or relay such as already described.

The motor has an armature 115 whose brushes are connected to a pair of terminals A and B through a suitable source of power, such as a battery 116. Terminals A and B are adapted to be connected to the corresponding terminals of any of the foregoing valves. The motor is provided with an adjustable separately excited field 117. Connected to the motor shaft to be driven thereby, and thus to simulate the operation thereof, is a small direct current generator or tachometer machine 118. The tachometer has an adjustable separately excited field 119. One brush of the tachometer is connected to a terminal C in series with a battery 120, while the other brush of the tachometer is connected to a terminal D. The tachometer 118 and the battery 120 are in opposition, the battery voltage normally predominating slightly over the tachometer voltage. Terminals C and D are adapted to be connected to like designated terminals of the devices shown in any of the foregoing figures.

The tachometer, being driven as it is directly by the shaft of the machine to be controlled and having no motion of its own, injects into the system no mechanical inertia affecting the regulation and control. The currents necessary to create the required grid potentials of the relays are extremely small, in fact, where negative grid potentials are employed, no actual flow of current may be required. Consequently, the induction of the tachometer machine windings is practically or absolutely nil.

Variations in motor speed brought about by changes in the voltage of its source of power, load, etc., immediately varies the difference in voltage between battery 120 and tachometer 118, which varies the voltage impressed upon the sensitive circuit connected to terminals C and D. Through the influence of the grid potential within the vessel the main discharge is practically simultaneously varied in an amount corresponding to the relay ratio of the valve. The main discharge controls the current through the motor armature so that speed variations thereof are automatically corrected.

What is claimed is:

1. An electroionic discharge valve comprising a gas filled vessel, a main discharge path within said vessel including an electrode for varying the gas pressure within said vessel and means for maintaining a predetermined gas pressure within said vessel including a grid within said vessel, for controlling said main discharge path.

2. An electroionic valve comprising a vessel, an ionizable medium within said vessel, a plurality of electrodes within said vessel providing a discharge path therein, one of said electrodes being adapted to vary the pressure of said ionizable medium and means including a grid within said vessel for controlling the discharge between said electrodes to maintain the pressure of said ionizable medium at a predetermined value.

3. An electroionic valve comprising a gas filled vessel, an electrode therein for governing the pressure of the gas and control means for said electrode comprising a grid within said vessel and means for varying the potential of said grid automatically in response to pressure conditions within said vessel.

4. An electroionic valve having in combination a gas filled vessel, an electrode therein adapted when heated to vary the pressure of the gas, a discharge path in the vessel, and means influenced by the discharge path and controlling the temperature of the electrode.

5. An electroionic valve comprising a gas filled vessel, an electrode therein adapted when heated to vary the pressure of the gas, a discharge path within the vessel, and means including an auxiliary electrode controlling the temperature of the pressure controlling electrode, the condition of the auxiliary electrode being influenced by the discharge path.

6. An electroionic valve having in combination a gas filled vessel, means providing within said vessel paths for main and auxiliary electroionic discharges, said main discharge path including an electrode for varying the gas pressure within said vessel, and means within said vessel under the control of said auxiliary discharge path to control said main discharge path for regulation of the gas pressure within said vessel.

7. A gas pressure regulator for an electroionic valve, comprising means including an electrode within the device adapted when heated to vary the gas pressure, a discharge path, and means influenced by the discharge path and controlling the temperature of the electrode.

8. An electroionic valve comprising a vessel, means therein for producing gas, a gas pressure indicator for said vessel, and a pressure control discharge path within the vessel, the control discharge being adapted to influence both the indicator and the gas producing means.

In witness whereof, I have hereunto subscribed my name.

FRIEDRICH WILHELM MEYER.